United States Patent [19]
Hoberman

[11] 3,866,893
[45] Feb. 18, 1975

[54] APPARATUS FOR DESOLDERING SCRAP RADIATOR CORES AND RECOVERING SEPARATED METALS

[76] Inventor: Richard Hoberman, 1030 Hillcrest Dr., Omaha, Nebr. 68132

[22] Filed: Feb. 5, 1974

[21] Appl. No.: 439,743

[52] U.S. Cl. ................................. 266/33 S, 75/63
[51] Int. Cl. ........................................... F27b 17/00
[58] Field of Search....... 75/63, 64, 65 R; 266/33 R, 266/33 S

[56] References Cited
UNITED STATES PATENTS
| | | | |
|---|---|---|---|
| 1,669,485 | 5/1928 | Nordling et al. | 75/63 |
| 2,764,473 | 9/1956 | Klein et al. | 75/64 X |
| 3,394,063 | 7/1968 | Blume | 75/63 X |

FOREIGN PATENTS OR APPLICATIONS
| | | | |
|---|---|---|---|
| 530,003 | 12/1940 | Great Britain | 75/63 |

*Primary Examiner*—Gerald A. Dost
*Attorney, Agent, or Firm*—Bacon & Thomas

[57] ABSTRACT

Desoldering apparatus for scrap radiator cores comprises a fused salt bath tank and a removable, perforated basket unit mounted for rotation and reciprocation with respect to the tank for effecting rapid heating and sweating out of solder from radiator cores supported in a basket. Solder and bath material may be constantly removed from the bottom of the tank, with solder being recovered and bath material recirculated to the tank in one embodiment. Basket rotating and reciprocating drive systems are disclosed, and an alternate embodiment features a lift-out tray for removing separated solder from the tank.

7 Claims, 5 Drawing Figures

3,866,893

APPARATUS FOR DESOLDERING SCRAP RADIATOR CORES AND RECOVERING SEPARATED METALS

BACKGROUND OF THE INVENTION

The desireability of recovering brass and copper from junk automobile radiator cores on a production basis through a process that was economically and practically feasible has generated, in the field of scrap recovery, many attempts at producing junk radiator core desoldering units with the above objectives. The attendant financial rewards of achieving such a goal need no elaboration.

Representative prior art desoldering units are shown in the U.S. Patents, such as, for example, Nordling et al. No. 1,669,485 (1928); Eppensteiner et al. No. 1,826,755 (1931) and, in more recent times, Lambert No. 3,393,998.

While some of the experts and prior inventors in this field recognized that a fused salt bath for heating the cores to be desoldered was an ideal heat transfer medium, and that fused solder needed to be protected from oxidation resulting from excessive temperature exposure, the present inventor stands alone in recognizing that a system for rapidly and continuously removing the separated solder during the desoldering operation was ideal for minimizing the detrimental high temperature effects the salt bath would have on the solder and that an improved agitation system for the radiator cores in the salt bath would enable rapid removal of the solder from the radiator cores at the lowest practical operating temperature of the salt bath.

One of the problems to be solved was how to remove the solder continuously, in accordance with one embodiment of this invention, which necessitated removal of some of the salt bath from the desoldering tank, without producing a net loss of salt bath with the requirement that the removed bath be made up with new salt bath materials.

Still another problem to be resolved was how to melt and separate the solder from the scrap radiator cores in the shortest time (i.e. the most economical time) and at the lowest practical working temperature consistent with recovery of pure solder metals. Agitation of the radiator cores has been long recognized as being desireable in desoldering apparatus, but an improved agitation process that could be practically utilized in a scrap recovery unit at minimum cost needed to be found to separate the solder from the cores faster and at a lower temperature.

As with many other metal reclaiming processes, the actual desoldering of scrap radiator cores is but one of many treatments the cores are subjected to. Usually, the cores must be washed, chemically cleaned and dried before they are immersed in the desoldering bath to protect the purity of the bath. Following the desoldering operation, the cores must be cooled and further processed to remove the bath materials from the cores.

The present inventor recognized the need for a simple, expeditious means for physically containing a batch of scrap radiator cores in a single basket unit that could be transported to each treatment station once it was loaded, including the desoldering apparatus. The basket unit would contain its own rotary drive system which would move with the basket unit through each processing station. This feature, of course, further permits continuous operation of each work station while multiple basket units are loaded and moved sequentially through each station with a batch of scrap cores to be processed. The present inventor further recognized that the use of even a single basket unit that was capable of moving between processing stations, including the desoldering apparatus of this invention, eliminated the time consuming task of loading and unloading batches of radiator core units at each individual processing station.

Finally, under conditions where immediate and continuous removal of separated solder was not essential or was impractical on a production basis, the present invention provides for use of a simple lift-out tray unit that is disposed on the bottom of the desoldering tank as a simple and practical arrangement for complete removal of solder and other separated contaminants from the desoldering bath at suitable and periodic intervals.

SUMMARY OF THE INVENTION

In the light of the above recognitions of problems to be solved in the recovery of scrap radiator core metals (brass, copper and solder alloys), the present invention was conceived and developed to achieve the objectives long sought after in this field.

A desoldering tank accommodates a removable basket assembly which contains a batch of scrap radiator cores to be desoldered. The basket unit is mounted relative to a fixed framework so that it can rotate about a longitudinal axis and reciprocate in a vertical plane normal to that axis to intensively shake and agitate the scrap core units in the desoldering tank.

The desoldering tank of this invention contains a fused metallic salt bath that is inert with respect to the metals sought to be recovered, particularly the lower melting solder metals, and solder sweated out of the cores is continuously or periodically removed from the bottom of the tank during each desoldering operation or at any other desired interval of time.

Both fused solder and a portion of the heating bath may be tapped from the tank bottom area during the continuous solder recovery operation. The solder is settled out from the bath material almost immediately, and the bath material is pumped back into the tank rapidly after the settling out of the separated solder, which is recovered, washed, and formed into ingots for sale to the trade.

The basket for containing the cores is supported resiliently on a fixed supporting framework. A reciprocating motion drive motor shakes the basket in a vertical plane at a desired frequency and amplitude of motion. The drive motor for rotating the basket about its own axis is attached to and travels with the basket unit through all processing stations, including the desoldering tank, while the basket reciprocating drive system stays with the desoldering tank apparatus.

A desoldering system for recovering scrap radiator core metals in an economical, highly productive manner is thereby achieved by this invention.

DETAILED DESCRIPTION OF THE PREFERRED EMBODIMENTS

Figure 1:
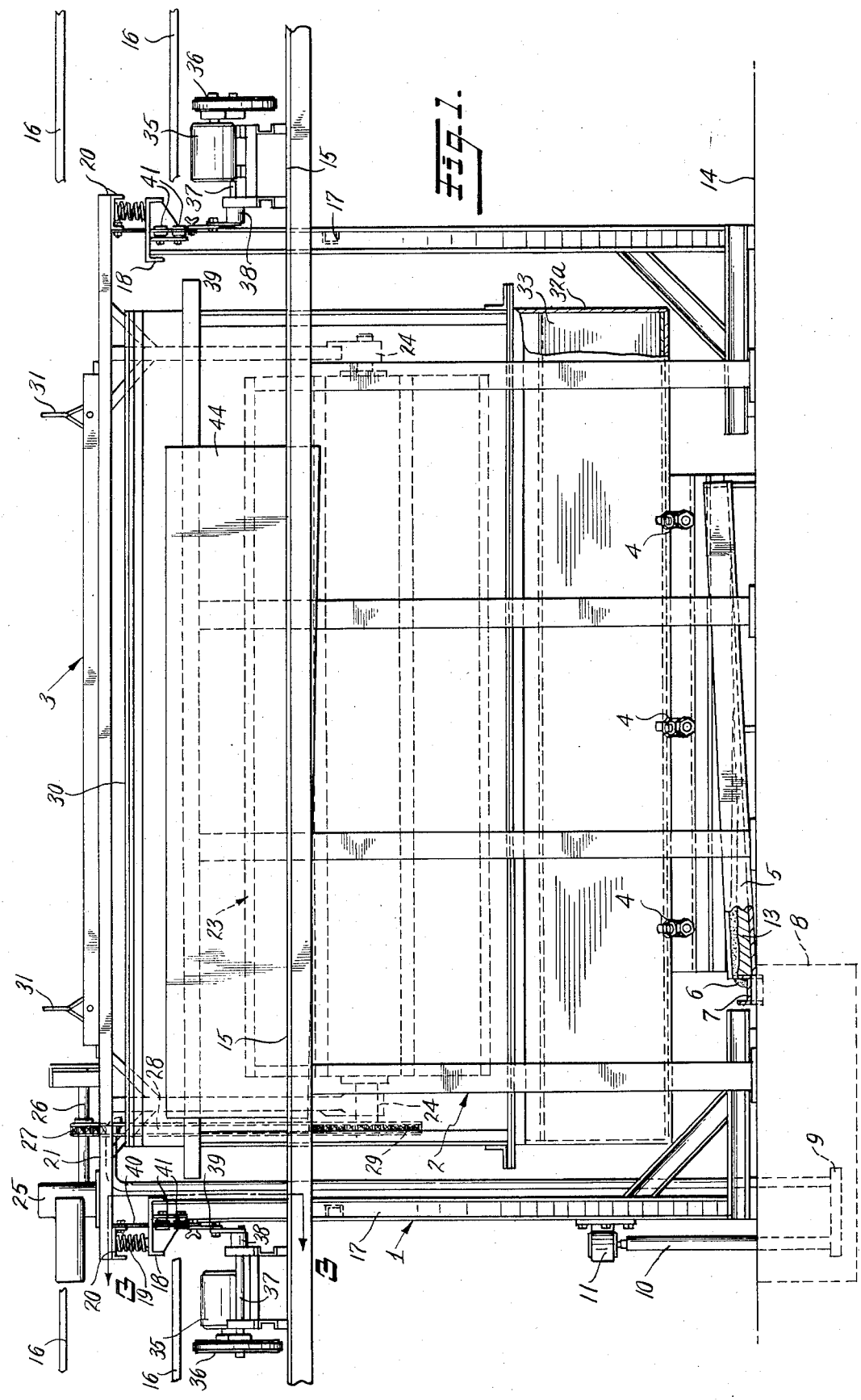
FIG. 1 is a side elevational view of the desoldering tank apparatus, including the shaker basket assembly and solder recovering system.
Figure 2:
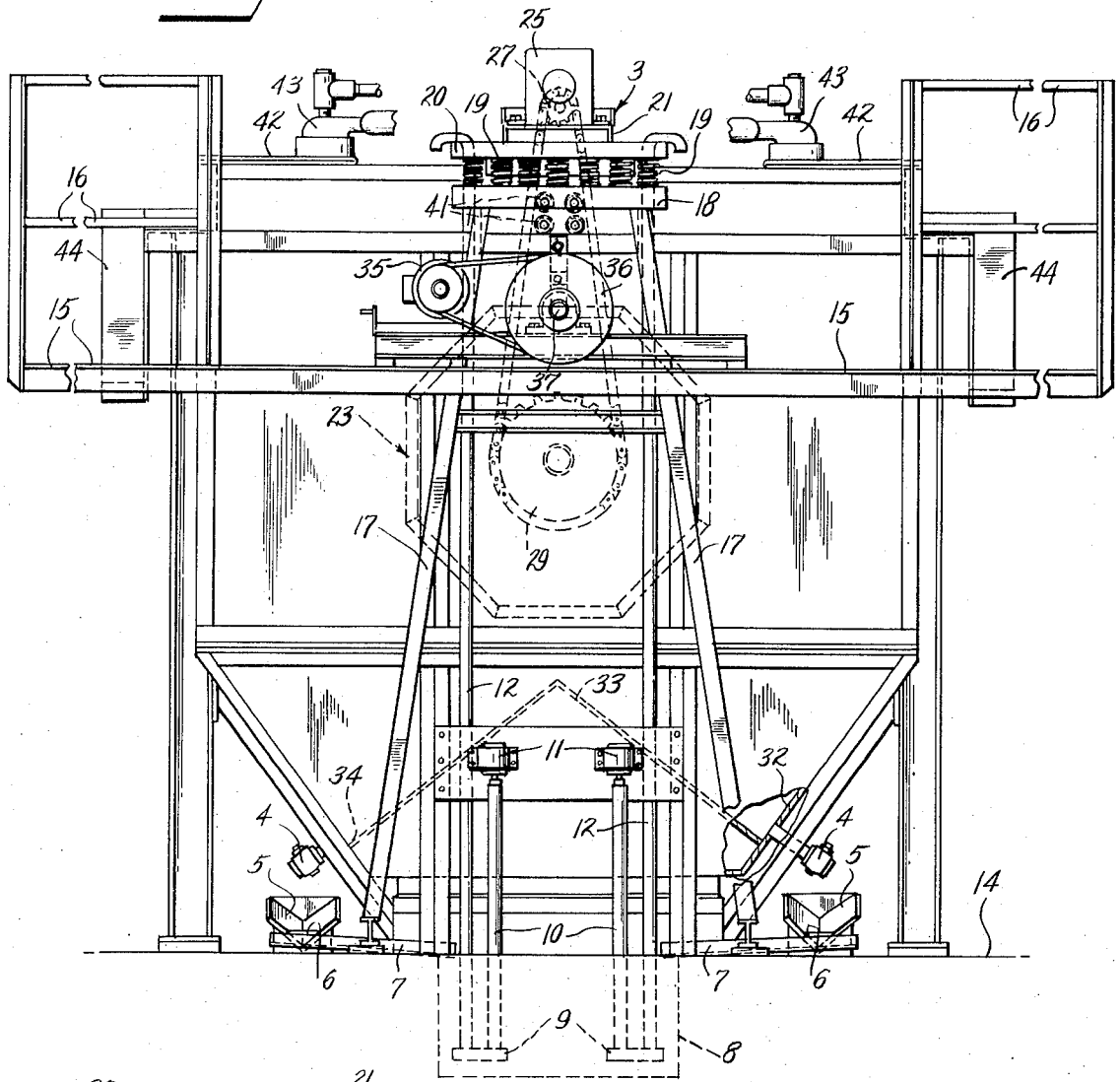
FIG. 2 is an end elevational view of FIG. 1.
Figure 3:
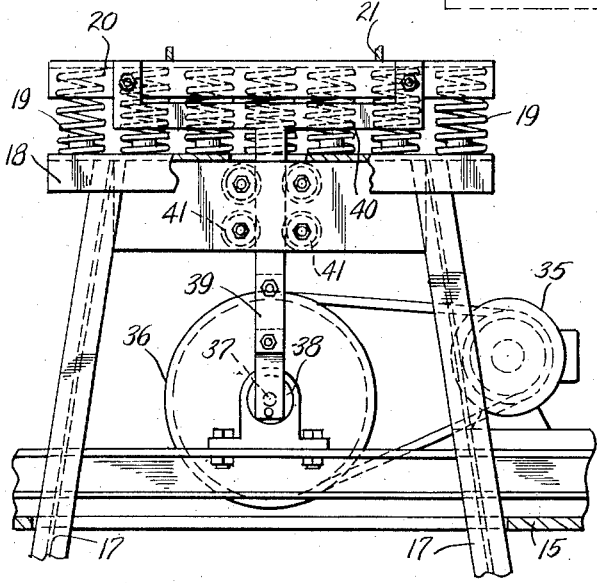
FIG. 3 is a detail view of the basket shaker drive and basket suspension systems.

With reference to FIGS. 1-3 of the drawings, a preferred embodiment of the radiator core desoldering apparatus embodying this invention is illustrated in detail: a fixed frame and tank support assembly generally indicated by the reference numeral 1 supports a tank 2 which is normally filled with a fused salt bath heat transfer medium and a basket assembly 3 for supporting radiator cores (not illustrated) to be desoldered in the tank 2.

As will be more fully described below, the basket assembly 3 is mounted in such a manner on frame 1 that radiator cores place in a perforated basket suspended in the heat transfer medium in tank 2 are subjected to intense rotary and reciprocal agitation motions in the medium, causing solder that has been sweated from the cores to be separated therefrom and to drop through the heating medium to the bottom of the tank 2 in a most efficient manner.

In the embodiment of FIGS. 1-3, from the tank bottom, separated solder is continuously removed through valves 4 for recovery by a settling process utilizing settling chambers in the form of inclined troughs 5 having weirs 6 at the lower ends thereof whereby heat transfer medium that is discharged through valves 4 with separated solder is separated from the solder and flows over the weirs 6 into a conduit 7 which discharges the heat transfer medium to a sump area 8.

Recirculation pumps 9 driven through drive shafts 10 by motor 11 circulate the heat transfer medium from sump 8 back into the tank 2 through conduits 12 which discharge into the top of the tank.

Recovered solder 13 which drops to the bottom of settling troughs 5 almost immediately is removed for further reprocessing on a continuous basis, and radiator cores that have been desoldered are removed from the tank 2 for further cleaning and processing.

Considering the drawings now in more detail, in FIGS. 1-3, the frame and tank support 1 normally rests on a base or ground level 14 and comprises a structural framework of beams and channel girder sections designed to support the tank and basket assembly and associated apparatus for carrying out the systematic desoldering of radiator cores on a large scale and continuous commercial level. Included in the framework is a catwalk 15 and guiderail 16 for supporting operators near the top of the tank 2.

At the top of a pair of uprights 17 located at each end of the framework 1 is provided a horizontal support member 18 shown in the form of a channel member, fixedly secured to the uprights 17.

As shown in FIG. 1 and in more detail in FIG. 3, a set of spring elements 19 resiliently connect a second channel section 20 to the fixed support 18. On top of element 20 is removable secured the basket assembly 3, which includes a longitudinally extending support beam 21 which spans the frame assembly 1 between uprights 17 so as to be resiliently supported with respect to the top members 18 as shown in FIG. 1.

Vertically depending members 22 extend from beam 21 and energize a perforated radiator core supporting basket 23 through bearing blocks 24 which hold basket 23 for rotatable motion about a longitudinal axis extending through the bearing blocks 24.

Mounted on beam 21, a basket rotary drive system includes a motor 25, drive shaft 26 and a drive sprocket element 27, drive chain 28 and basket sprocket 29 which, when motor 25 is suitably energized, cause rotation of basket 23 about its longitudinal axis. The basket 23 normally is below the surface of heat transfer medium in tank 2, and is placed in the tank through a tank top opening 30 which is normally covered by closure doors.

As seen in FIG. 1 the entire basket assembly, including beam 21, basket 23 and the basket rotating drive system, may be lifted by means of lift hooks 31 and separated from the frame and tank system independently as a unit simply by disconnecting fasteners (not shown) which secure the opposite ends of beam 21 to channel members 20.

The tank unit 2 is a container for a liquid heat transfer medium which substantially fills the tank and comprises a suitable fused alkali metal salt bath which is maintained at a suitable elevated temperature by means of suitable heating means (not shown) within the tank 2.

The salt bath may comprise, for instance, fused sodium nitrate with a small amount (i.e., up to 1 percent) of sodium dichromate added to retard oxidation effects of the bath on the fused solder sweated from the radiator cores during the desoldering operation. Alternatively, a 50—50 mix of sodium nitrate-potassium nitrate also has been sucessfully used, with the addition of a small amount of potassium chromate. Fused alkali metal salt baths per se used for heating metals for various purposes are, of course, generally well known in the art. The essential requirement in this invention is that the heat transfer medium be maintained at a temperature sufficiently high to melt the solder from the radiator cores, while not so high as to promote oxidation of the solder or melting of the non-ferrous metals (copper and brass), of the radiator cores. The objective is to recover the solder in as pure a form as is practical as well as to recover the radiator core elements completely free of solder contaminant.

In practice, the salt bath is slightly superheated to about 825°F before a desoldering operation is started. Immersion of the basket assembly and a workload of radiator cores drops the bath temperature to the working range of 700°–775°F, preferably 750°F–775°F. It has been found in practice that 775°F approximates an ideal temperature of the salt bath for promoting good sweating out of the solder from the radiator core workpieces without oxidizing ("burning up") the separated solder, normally comprising 77–78% lead, 23–22% tin.

The tank 2 in FIGS. 1-3 includes a bottom area having sloping side walls 32 and straight end walls 32a and a series of peaked baffles 33 which provide a pair of double sloping bottom surfaces 32–33 along the tank bottom area for directing separated solder to channel-like bottom sections 34 of tank 2. Adjacent these bottom areas of the tank, outlet valves 4 are provided, preferably along the tank length in several places, for continuously drawing off separated solder from the tank interior as soon as the desoldering operation is under way. This phase of operation of the apparatus is important, since it enables the solder to be drawn off continuously and substantially as soon as it is separated from the radiator cores, before it has had an opportunity to become oxidized in the salt bath to any extent.

To enable the solder recovery to proceed without a net loss of fused salt medium, a recirculation arrangement is provided for the salt bath that is drawn off through valves 4 with separated solder material. This comprises the settling troughs 5 described above, weirs 6, conduits 7, sump 8, pumps 11, and return conduits 12. Solder is thus continuously recovered from the bottom of troughs 5, cooled, washed and remelted into ingots for marketing and sale in the trade. The salt bath circulating through the recirculation system cools but little and the heating system in the tank 2 maintains a suitable temperature of the salt bath, taking into account the slight recirculation heat losses.

The perforated basket 23 which contains the radiator cores to be desoldered is subjected both to a rotary action about its longitudinal axis and a reciprocating action in a vertical plane extending transversely of the longitudinal axis. This ensures maximum agitation of the radiator cores in the heating bath and is conducive to a maximum separation rate of solder from the core structures. The rotary motion and drive means for accomplishing this motion have been described above.

Reciprocating motion of basket 23 is accomplished by means of reciprocation drive motors 35 located adjacent opposite ends of tank 2 supported on catwalk area 15 of frame 1 in the vicinity of the uprights 17. Each motor 35 drives a pulley 36 which, as better viewed in FIG. 3, is connected to a drive shaft 37 connected to crank 38. Crank 38 is adjustably connected for achieving a variable length throw to drive link 39 connected to a lower arm of yoke member 40. Yoke 40 is guided by rollers 41 for vertical reciprocating motion only through an aperture in member 18 whereby the rotary input of motor 35 is changed to alternating reciprocating motion of yoke member 40. The upper portion of yoke 40 is rigidly fixed to upper channel member 20 whereby, upon energization of motors 35, the entire basket assembly 3 is reciprocated in a vertical plane extending normal to the horizontal axis of the basket, while the basket 23 is simultaneously rotated about its own longitudinal axis by its rotary drive motor 25. Of course, the motors 35 and crank elements 38 are preferred elements, and it is fully contemplated within the scope of this invention that various motor systems could be readily adapted for reciprocating the basket assembly 3. For example, a reciprocating hydraulic motor (not shown) could readily be directly coupled between the ends of beam 21 and the fixed frame 1. Likewise, various motion converting systems could be utilized between a rotating motor such as motor 35 and the beam 21. The system shown herein represents a suitable choice in the interest of expediency, low cost, and servicibility of elements.

The motors 35 will normally reciprocate the beam ends of basket assembly 3 in similar phase relationship (both ends up and down simultaneously) at a desired frequency. A vertical stroke of approximately 0.75 inch at a frequency of 300 or more strokes per minute has been successfully used in a desoldering operation utilizing the presently disclosed apparatus.

A suitable tank cover member 42 comprising pivoted door sections may be provided to protect the bath in tank 2 and suitable heat supply plumbing 43 and heat vent ducts 44 are normally provided, along with various control systems not comprising a material part of the present invention.

A typical desoldering operation utilizing the apparatus shown in FIGS. 1–3 will normally proceed as follows. A perforated basket 23 is loaded with radiator cores to be desoldered outside the desoldering tank 2 of the present invention. The basket, with its load of dirty or unprocessed cores, is first immersed in a hot water bath where the basket is rotated and the cores are subjected to a preliminary wash. The basket is then transferred to a hot caustic cleaning bath for further removal of surface contamination from the radiator cores. The cores then are rinsed in water and completely dried in an oven while still in the basket. During all the preceding operations, the basket may be rotated to enhance exposure of all the cores to the respective treatment they are being subjected to.

The basket with its cleaned and dried cores is now immersed in the desoldering tank 2 of the present apparatus in the manner above described. The tank is rotated and reciprocated for a suitable interval of time to cause desoldering of the radiator cores. The basket assembly is removed from the tank after the desoldering operation and, following a suitable cool down period, the copper and brass elements making up the radiator core units are removed from the basket for further processing or briquetting.

Obviously a distinct advantage of utilizing a removable basket assembly is that several basket units may be utilized for various processing operations so that the desoldering tank can be continuously utilized on a commercial, production basis. However the rotary motor for each basket unit accompanies the basket during its travel through the several processing steps and this enables the basket to be rotated at each work station without the requirement for hooking up a power train to the basket at each station.

Removal of solder from the bath on a continuous basis as soon as solder separation is initiated further enhances the commercial value of the apparatus constructed in accordance with this invention, since the separated solder is of higher quality (less oxidized or contaminated) than if it were removed only periodically. The constant recirculation of salt bath back to the tank enables the continuous removal of solder without a net loss of bath that would otherwise require makeup of salt bath materials.

Figure 4:
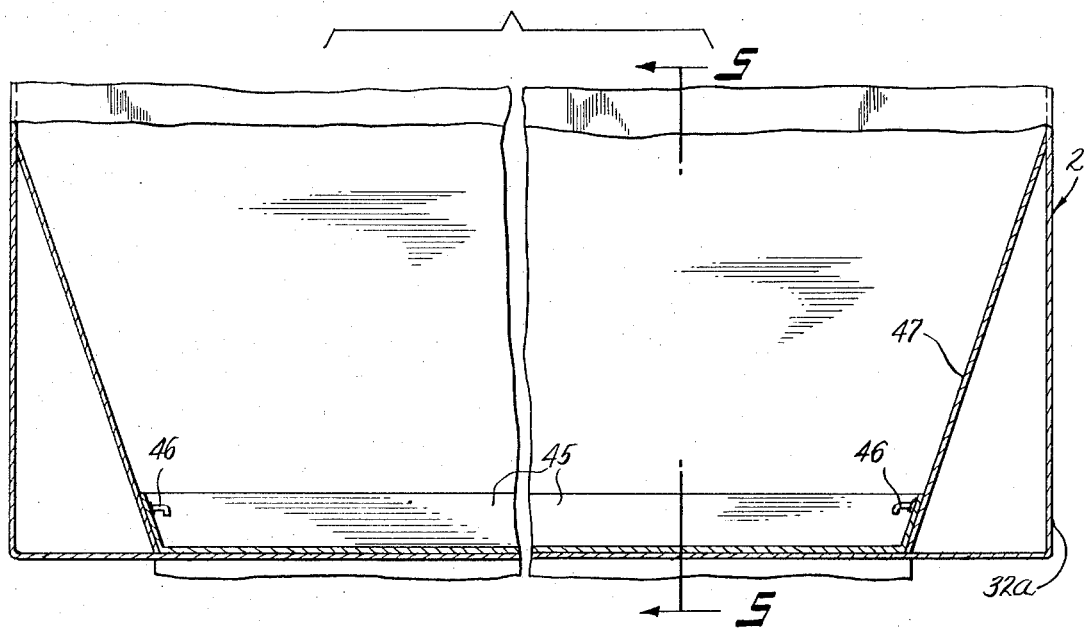
FIG. 4 shows an enlarged side view of an alternate lift-out solder removal tray system for the desoldering tank.
Figure 5:
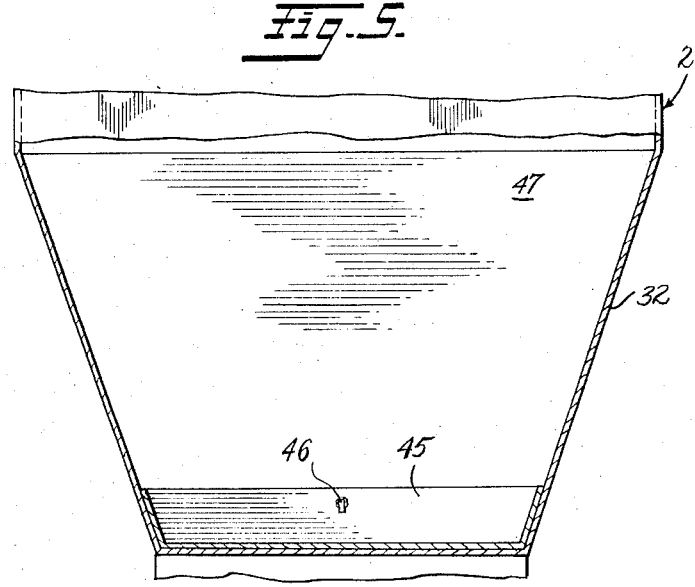
FIG. 5 is an end view of FIG. 4.

However there are situations and circumstances which may not warrant the continuous solder removal and recirculation of the bath. In FIGS. 3 and 4, a more economical lift out tray 45 having lift hooks 46 is shown. Here the straight end walls 32a of tank 2 may be provided with inwardly tapered baffle elements 47 which in effect provide an inward taper for the straight end walls 32a corresponding generally to the inwardly sloped side walls 32. The peripheral contours of the tray 45 are configured to correspond to the inner contours of the bottom section of the tank for a close fit.

Thus, with this embodiment, accumulated solder and sludge materials separated from the radiator cores can be periodically removed from the tank bottom between desoldering operations. The advantage of this arrangement is that the solder is completely removable in a single step from the entire tank bottom, and the tendency for solder and sludge buildup due to incomplete removal by other methods, including the outlet valves 4, is eliminated. The arrangement of baffles 47 and baffles 33 (FIGS. 1-3) allows the tank 2 to be readily converted from one operating mode to the other, depending on the choice of the operator.

I claim:

1. Apparatus for desoldering radiator cores comprising:
   a. a fixed frame and tank support assembly;
   b. a tank supported by said support assembly, said tank having a top opening and a bottom;
   c. a fused heat transfer medium in said tank, the temperature of said medium being maintained by a suitable heating means at a temperature greater than the melting temperature of the solder to be separated from said radiator cores, but less than the melting temperature of said cores;
   d. a basket assembly for supporting radiator cores to be desoldered in said heat transfer medium, said basket assembly comprising a perforated basket mounted for rotary motion about a longitudinal axis within said heat transfer medium through said tank top opening, and supported with respect to said fixed frame and tank support assembly for reciprocating motion in a plane extending transversely of said longitudinal axis;
   e. means for simultaneously rotating said basket about its longitudinal axis and causing its cyclic reciprocation in said transverse plane to impart intense agitation to radiator cores placed in said basket and to cause solder sweated out from said cores by said heat transfer medium to be separated from said cores; and
   f. means for recovering separated solder from said tank bottom.

2. Apparatus for desoldering radiator cores as recited in claim 1 wherein said tank is elongated, has a pair of double sloping bottom surfaces extending along its length, and multiple outlet valves located adjacent to the lowest points of said bottom surfaces; and further wherein said fused heat transfer medium is principally sodium nitrate maintained at a temperature of approximately 775°F to minimize oxidation of fused solder; and said means for recovering separated solder further includes:
   a. settling receptacles externally of and adjacent opposite sides of said tank bottom for continuously recovering the discharge of said tank bottom valves and separating fused solder from that portion of the heat transfer medium discharged through said valves with said solder;
   b. a sump for receiving heat transfer medium separated from said separated solder in said receptacle;
   c. conduits for conveying said separated heat transfer medium from said receptacle to said sump; and
   d. a recirculating pump and return conduit for returning heat transfer medium from said sump to said tank continuously during the desoldering operation.

3. The apparatus for desoldering radiator cores as recited in claim 2, wherein said settling receptacles comprise inclined trough members, each having a weir at its lower end, said trough members extending substantially along the full length of said tank bottom adjacent said valves.

4. The apparatus for desoldering radiator cores as recited in claim 1, wherein said means for recovering separated solder comprises a lift-out tray disposed on the bottom of said tank, said tank having inwardly sloping interior wall portions adjacent the said bottom thereof, and said tray covering substantially the entire bottom of said tank within said interior walls and in close conformity with the bottom and interior walls of said tank adjacent the bottom of the tank.

5. The apparatus for desoldering radiator cores as recited in claim 1, wherein said basket assembly further comprises a longitudinal support beam; a pair of vertical basket engaging members extending below said beam, said engaging members having end bearings for rotatably mounting said basket therebetween; wherein said means for rotating said basket comprises a basket rotating motor fixedly mounted on said support beam, a drive sprocket and drive chain means extending between said motor and basket, and energizing means for said basket rotating motor; said support beam being furthermore resiliently support with respect to said fixed frame and tank support assembly by means of spring elements at opposite ends thereof, said spring elements extending between said beam ends and said fixed frame and support assembly; and furthermore wherein said basket cyclic reciprocating means comprises basket reciprocating motors located adjacent opposite ends of said beam and fixedly mounted on said frame and tank support assembly; means for energizing said basket reciprocating motors; and means connecting said basket reciprocating motors to each end of said beam for causing its reciprocation in a vertical direction simultaneously with the basket rotation motion, the beam motion being constrained by said spring elements.

6. The apparatus for desoldering radiator cores as recited in claim 5 wherein said basket reciprocating motors are rotary types, and wherein said connecting means between said basket reciprocating motors and beam ends comprises a variable throw crank and slide assembly.

7. The apparatus for desoldering radiator cores as recited in claim 6, further wherein said beam, basket rotating motor, and perforated basket are removably secured as a unit to said frame whereby said unit may be separated from the remainder of said desoldering apparatus for enabling further processing of radiator cores in said basket without removing them from the basket.

* * * * *